United States Patent [19]

Hesse et al.

[11] Patent Number: 4,690,692
[45] Date of Patent: Sep. 1, 1987

[54] SYNTHETIC RESIN BINDERS AND THEIR USE FOR THE MANUFACTURE OF ABRASIVES

[75] Inventors: Wolfgang Hesse, Breckenheim; Richard Settelmeyer, Schlangenbad-Georgenborn; Eckart Teschner, Hünstetten-Limbach, all of Fed. Rep. of Germany

[73] Assignee: Hoechst Aktiengesellschaft, Frankfurt am Main, Fed. Rep. of Germany

[21] Appl. No.: 623,616

[22] Filed: Jun. 22, 1984

Related U.S. Application Data

[63] Continuation of Ser. No. 141,000, Apr. 17, 1980, abandoned, which is a continuation of Ser. No. 936,833, Aug. 25, 1978, Pat. No. 4,251,408.

[51] Int. Cl.[4] .............................................. B24D 3/02
[52] U.S. Cl. ........................................ 51/293; 51/295; 51/298; 427/379; 524/841
[58] Field of Search .................... 51/293, 295, 298; 427/379; 524/841

[56] References Cited

U.S. PATENT DOCUMENTS

| | | | |
|---|---|---|---|
| 2,513,274 | 7/1950 | Barkhuff | 260/33.4 |
| 3,806,956 | 4/1974 | Supkis et al. | 51/295 |
| 3,888,640 | 6/1975 | Bigorajski et al. | 51/298 |
| 3,942,959 | 3/1976 | Marköö et al. | 51/295 |
| 3,963,458 | 6/1976 | Gladstone et al. | 51/295 |
| 4,038,046 | 7/1977 | Supkis | 51/295 |

FOREIGN PATENT DOCUMENTS 1570848  11/1973  Fed. Rep. of Germany .
762462  11/1956  United Kingdom .

*Primary Examiner*—Paul Lieberman
*Assistant Examiner*—Willie J. Thompson
*Attorney, Agent, or Firm*—Quaintance, Murphy & Presta

[57] ABSTRACT

This invention relates to a method for the manufacture of an abrasive material by means of a synthetic binder based on a mixture of phenolic resins. The phenolic resins employed have a great stability in storage, its curing times are at most equal to but preferably shorter than those commonly used, therefore higher production speeds or substantially smaller drying installations for the same production speed may be used. The binder contains only small quantities of free formaldehyde, phenol and especially formaldehyde are released in substantially reduced quantities to the environment even when the binder is heated to elevated temperatures, including temperatures above the processing temperature. The release of these substances is also considerably reduced when the abrasive material is subsequently used. The synthetic binder is based on an aqueous mixture of phenolic resins and optionally other additives wherein the mixture of phenolic resins comprises (I) at least one phenolic-resol and (II) at least one co-condensate of at least one monohydric phenol and at least one polyhydric phenol with formaldehyde. The molar ratio of the quantities of formaldehyde used to the sum of phenols in component (II) is within the range of from 0.6:1 to 1.5:1. An abrasive material prepared by means of said method is a further object of this invention.

14 Claims, No Drawings

SYNTHETIC RESIN BINDERS AND THEIR USE FOR THE MANUFACTURE OF ABRASIVES

This is a continuation of copending application Ser. No. 141,000, filed 4/17/80, abandoned 7/9/84; which is a continuation of copending application Ser. No. 936,833, filed 8/25/78 now U.S. Pat. No. 4,251,408.

This invention relates to synthetic resin binders based on an aqueous mixture of various phenol resins and to the use of these binders in the production of abrasives on flexible substrates.

Abrasives are used in many technical fields, especially for surface finishing. These abrasives are generally produced by first applying to a substrate a liquid binder layer, the so-called basic binder layer, which may contain additives such as fillers, and subsequently applying abrasive particles to the substrate. Electrostatic methods are often employed for this latter step in order to deposit the particles in such a manner that they have a particularly effective abrasive action. After fixing of the abrasive particles, it is customary to coat them with one or more further binder layers (defined as sizer).

The binders used in the preparation of abrasives are mainly aqueous solutions of phenolic resins, especially those of phenol and formaldehyde. Since the binders are required to be in a sufficiently fluid state and capable of binding when applied to the substrate, in other words they must not be in a cured state, so-called phenolic resin precondensates are generally used, in which curing to form a three-dimensionally cross-linked polycondensate only occurs in any subsequent drying process. Such polycondensates impart to the final abrasive the desired properties and resistance, especially to chemical and physical influences at elevated temperatures.

Phenolic resin solutions based on monohydric phenols are currently the most commonly used binders for abrasives which may be subjected to temperature stresses. They are produced and employed on an industrial scale. Phenol-resorcinol formaldehyde resins which are capable of being rapidly cured have been described in German Offenlegungsschrift No. 15 70 848 as adhesives in combination with formaldehyde or one of its higher polymers, but they cannot be used on their own for the manufacture of abrasives because the cured product is friable and of little hardness so that no abrasive action is produced.

Curing processes in the production of abrasives require special manufacturing techniques and a large expenditure in both apparatus and time. In order to avoid degradation of the substrates used in the manufacture of the abrasives, which are generally cellulose materials, the curing process may not be carried out at temperatures higher than from about 120° to 130° C. Rapid curing, e.g. by increasing the curing temperature, is not possible, firstly, because of the nature of the substrate (as mentioned above) and secondly because more rapid hardening is liable to cause considerable blister formation which impairs the adherence of the resin to the substrate. Curing of the coated material is therefore generally effected over from one to several hours.

Mixtures of phenol-formaldehyde resins of monohydric phenols and polyphenol-formaldehyde resins have been disclosed in British Pat. No. 762,462 as impregnation binders for use in the production of reinforced products, but the use of such mixtures in the production of abrasives is not described. Furthermore, when such mixtures are used in the production of abrasives, several investigations have found that a reduction in abrasion index takes place. The abrasion index is a measure of the specific ability to remove surface material from a test specimen which an abrasive is capable of performing under specified constant conditions, and defined by the quotient A/V (where A is the weight of material removed and V is the cutting wear of the abrasive).

When curing binders based on monohydric phenols, it has been attempted in practice to employ a low initial curing temperature with a regulated, progressively increasing temperature, and it has been possible thereby to prevent blister formation. However, the time required for crosslinking is thereby increased.

To avoid prolonging the drying process excessively, since it uses up valuable time and space in the production plant, rapid cross-linking of phenolic resins is desirable. Developments in this direction have been limited, however, by the fact that the tendency of binders to undergo polycondensation reactions is not confined to the processing temperature, but also takes place at room temperature. The rate of polycondensation of binders based on phenolic-resins therefore cannot be increased beyond a certain limit because the stability in storage, which has already been reduced to the lower limit of what is technically acceptable, would be reduced to a point where the product would in practice be unsuitable. Thus binders used industrially are generally be stable for from 2 to 4 weeks at 20° C., from 5 to 10 days at 30° C. and from 1 to 3 days at 40° C. Although the stability in storage may be increased to 2–4 months by storing the binders at 5° C., such storage conditions may only be carried out by the manufacturer and the consumer and they are impractical to maintain during transport, from economical and health considerations. The marketing distribution radius of these binders is thus considerably restricted. It is therefore impossible to meet the demand for the product in remote areas where production plants are therefore not available.

In practice, therefore, for the reasons given above, the rate of the drying and curing process of the phenolic resin-bound abrasives hitherto used cannot be increased either by raising the curing temperature or by increasing the reactivity of the phenol resins but still requires an extended time. In order to be able to employ such long times and still achieve high production rates, webs of abrasive material are dried and cured in heating ducts which are designed in the form of suspended ducts (heated with circulating hot air), such as loop dryers or festoon dryers. These generally have lengths up to 100 meters for the predrying hanging zone (intermediate hanging zone) and up to several hundred meters for the main hanging zone. In spite of the large plant employed, the drying process of an abrasive manufacturing plant is still the most limiting factor, since the lengths of abrasive must first undergo a predrying operation for up to several hours at temperatures of up to 95° C. in order to remove the large quantities of water present in the binders and must then be heated for several hours (1 to 4 hours) at temperatures of from 120° to 130° C. in order to achieve optimum curing and drying.

There is therefore a need for binders for use in the production of phenolic resin-bound abrasives, which binders desirably have the following characteristics:
 stability in storage several times greater than that presently achieved;
 curing times at most equal to but preferably shorter than those commonly employed;

the ability to allow the use of either substantially higher production speeds, or substantially smaller drying installations for the same production speed; and possibly also a qualitative improvement imparted to the final abrasive product.

In addition, binders for use in the production of abrasives should release little or no harmful substances so as not to harm production workers or to pollute the environment with toxic materials.

Although, as already mentioned above, it has hitherto been considered that phenol-resorcinol-formaldehyde resins are not suitable on their own for the production of abrasives, we have now surprisingly found that the disadvantages of these products which have been described can be obviated by the use of mixtures of various phenolic resins which contain a proportion of co-condensates of mono- and polyfunctional phenol-formaldehyde resins.

Thus, according to one aspect of the present invention there are provided synthetic resin binders comprising an aqueous mixture of phenolic resins and optionally other additives, wherein the mixture of phenolic resins comprises (I) at least one phenol-resol to which at least 1.1 mol of formaldehyde per phenolic hydroxyl group of the monohydric phenol is added and/or condensed, and (II) at least one co-condensate of at least one monohydric phenol and at least one polyhydric phenol with formaldehyde, which co-condensate contains from 1.1 to 1.9 mol of formaldehyde per mol of monohydric phenol and from 0.1 to 2.0 mol of a polyhydric phenol per mol of monohydric phenol, the molar ratio of the quantities of formaldehyde used to the sum of phenols being within the range of from 0.6:1 to 1.5:1.

The substances used as component (I) in the binders of the invention are preferably phenolic resins prepared by the addition and/or condensation of formaldehyde to monohydric phenols in the presence of one or more alkali metal or alkaline earth metal compounds as catalysts. The catalysts may be allowed to remain in the resin or they may be partially or completely removed or neutralised. Part of the formaldehyde may, if desired, be built into the resin in an unreactive form, e.g. in the form of methylene bridges. For this purpose, the same catalysts as mentioned above or acids may be used at elevated temperatures. The substances used as component (II), in the binders according to the invention which have a high potential rate of condensation with formaldehyde, are mixed condensates of monohydric phenols, formaldehyde and polyhydric phenols, e.g. resorcinol, pyrocatechol or pyrogallol. In the preparation of the mixed condensates, care should be taken to ensure that the well known capacity for high reaction velocity of the polyhydric phenol, e.g. of resorcinol, is substantially preserved.

Monohydric phenols which may be used for the preparation of components (I) and (II) include for example, m-cresol, 3,5-xylenol and, preferably, phenol itself, $C_6H_5OH$, although alkyl phenols having from 1 to 9 C-atoms in the alkyl group may also be used in admixture with phenol. In the latter case, the proportion of phenol is generally at least 50 mol %.

Preparation of the resin component (I) may be conveniently carried out in the usual manner, e.g. the monohydric phenol is reacted with polymeric formaldehyde and/or aqueous solutions of formaldehyde, generally at temperatures of from 30° to 100° C., preferably from 30° to 80° C., in the presence of alkali metal or alkaline earth metal compounds as catalysts, until the required degree of condensation is reached. The degree of condensation may be ascertained by determining the viscosity of the product and this is generally from 200 to 2000, preferably from 300 to 1000 mPa.s (20° C.). The molar ratio of monohydric phenol to formaldehyde should generally be at least 1:1.1 and is preferably in the range of from 1:1.3 to 1:2.2. The catalysts used are generally inorganic compounds, preferably sodium hydroxide solution, potassium hydroxide solution, magnesium oxide, calcium hydroxide or barium hydroxide. The catalysts are generally used in quantities of from 0.01 to 0.9 equivalents, preferably from 0.05 to 0.7 equivalents, based on the phenolic hydroxyl groups. The resin content of aqueous solutions is generally from 50 to 90%, preferably from 60 to 80%. It may either be adjusted by distillation or predetermined by a suitable choice of the concentration of the reactants. The phenolic resin solutions may be used directly, that is in the form in which they are obtained from the process of their preparation. It is often desirable to neutralise the catalyst in order to improve its stability in storage. Water soluble alcohols such as methanol, ethanol, propanol, and the like, or polyhydric alcohols such as glycols or glycerol may also be used in quantities of from 1 to 20, preferably from 2 to 10% by weight, based on the total quantity of binder, for the purpose of improving the solubilities in water and further improving the storage stability.

Component (II) consists of mixed condensates of monohydric phenols, formaldehyde and polyhydric phenols, preferably dihydric phenols, such as for example resorcinol. These may be obtained by first preparing a phenol-resol and then reacting this, for example with resorcinol. For this purpose, 1 mol of monohydric phenol is generally reacted with from 1.1 to 1.9 mol, preferably from 1.3 to 1.8 mol of formaldehyde at temperatures of from 30° to 100° C., preferably from 40° to 80° C., generally in the presence of from 0.1 to 0.9, preferably from 0.2 to 0.6 mol of an alkali metal or alkaline earth metal compound, until all the formaldehyde has been reacted. From 0.1 to 2.0 mol, preferably from 0.2 to 1.5 mol of polyhydric phenol is then generally added to this reaction mixture and reacted under the same conditions until the required degree of condensation, as determined by viscosity measurements, has been reached. The desired degree of reaction is reached when the viscosity is generally from 100 to 2000, preferably from 200 to 1000 mPa.s (20° C.). The molar ratio of the quantity of formaldehyde used to the sum of mono- and polyhydric phenols should not be more than 1.5:1 and is preferably from 0.7 to 1.3:1, but it is not advisable to use less than 0.6 mol of formaldehyde per mol of phenols. These resins may, like components (I) described above, be mixed with the above mentioned alcohols in the quantities previously mentioned.

The resin components prepared as described above generally have a good storage stability on their own.

Mixtures of various phenol resols (I) and mixed condensates (II) with each other may also be used as components for a mixture.

According to a further aspect of the present invention there is provided a method for the manufacture of an abrasive which comprises (1) applying a basic layer of synthetic resin binder according to the invention to a flexible substrate, (2) distributing abrasive particles in said layer, (3) drying said layer, (4) applying a further layer of synthetic resin binder (sizer) according to the invention, which optionally additionally contains conventional fillers, to the product of step (3), and (5) drying the said further layer and (6) curing the product.

The invention further provides abrasives manufactured according to the above method.

The substrates used in the production of abrasives are generally flexible materials such as, for example, paper, fabrics, vulcanised sheets, non-woven fibrous webs, foils and the like. Components (I) and (II) are generally mixed together in proportions of from 95:5 to 60:40, preferably from 90:10 to 70:30, to form a liquid binder which may if desired additionally contain conventional fillers such as, for example, calcium carbonate, gypsum, kaolin, cryolite and the like in the usual quantities. These additives are in most cases not added to the basic binder but to the sizer.

Manufacture of the abrasives according to the invention is carried out by applying binder and abrasive particles to a substrate in the usual manner. The processing time is generally from 2 to 48 hours but may be longer. Any of the usual materials may be used as the abrasive particles, such as, for example, sand, emery, silicon carbide, particulate aluminium oxide and the like. The binder is distinguished by the fact that it only contains small quantities of free formaldehyde and that phenol and especially formaldehyde are released in substantially reduced quantities to the environment even when the binder is heated to elevated temperatures, including temperatures above the processing temperature. Release of these substances is also considerably reduced when the abrasive is subsequently used, i.e. in sanding. The shorter cross-linking time of the binders according to the invention provides a major advantage over previously known binders.

The following Examples serve to illustrate the present invention. The following Table summarizes the results of processing tests and tests for technical abrasive characteristics, Experiments 1 to 3 exemplify the preparation of binder mixtures according to the invention, while Experiments 4 to 6 relate to comparison mixtures. In Experiments 7 to 9, the 100% phenol resin components of the mixture according to the invention are given for comparison.

The curing rate of a resin may be characterised by the so-called B-time. This is the time required by the resin when heated to change from a liquid state to a rubbery-elastomer state (B-state).

From the Table it can be seen that the B-time of the mixtures according to the invention is from 4 to 8 minutes at 120° C., compared with from 10 to 30 minutes for conventional binders. Curing is also greatly accelerated. The processing times are reduced from the two hours previously required for the pre-drying stage to 40–50 minutes, while the second, cross-linking stage at 130° C. may take only 20 to 30 minutes instead of the 1.5 to 4 hours previously required. No troublesome odour of formaldehyde is detected during processing either at normal temperatures or at elevated temperatures. The release of formaldehyde and phenol is found to decrease as the proportion of component (II) is increased. The main benefit of the new process, however, is that the quality of the abrasive is improved. When binders according to the invention are used, the abrasion index increases with increasing proportion of resorcinol-containing resin component (II) present up to 40%, generally about 25%.

In the following Examples, T denotes parts by weight and % denotes percentages by weight.

EXAMPLES

Preparation of resol component (I)

1. Phenol resin A-940 T of phenol, $C_6H_5OH$, are melted in a reaction vessel equipped with a stirrer and thermometer and mixed with 186 T of 37% aqueous formaldehyde solution. 38 T of 33% sodium hydroxide solution are added at 50° C., the temperature rising to 60° C. on addition of the sodium hydroxide. 420 T of paraformaldehyde (91%) are then added portionwise at a rate depending on the exothermic reaction, and the reaction mixture is stirred until the resin has a viscosity of 600 mPa.s (20° C.). After the addition of 80 T of methanol, the reaction mixture is cooled and adjusted to a pH of from 4.8 to 5.3 with dilute sulphuric acid. The yield of the resin obtained is quantitative. Residue: 68% (the residue is determined by heating a 2 g sample of 135° C. for one hour). Viscosity: 350 mPa.s (20° C.), which rises to 407 mPa.s (20° C.) after 6 weeks' storage at room temperature.

2. Phenol resin B Example 1 is repeated but the addition of methanol and of sulphuric acid are omitted. The resin has a viscosity of 650 mPa.s (20° C.) and a residue (2 g, 1 hour 135° C.) of 72%.

Preparation of reactivator component (II)

3. Phenol resin C-940 T of phenol and 200 T of a 37% aqueous formaldehyde solution are heated to 40° C. with stirring and 600 T of a 33% sodium hydroxide solution are added. The temperature is not allowed to rise above 60° C. during this addition of sodium hydroxide solution. A further 610 T of an aqueous 37% formaldehyde solution and 198 T of paraformaldehyde (91%) are then added at 60° C. at a rate depending on the exothermic reaction, and the reaction mixture is maintained at this temperature until no more free formaldehyde is present. 440 T of resorcinol are then added and the reaction mixture is stirred at 60° C. until it has a viscosity of 300 mPa.s (20° C.) and then cooled. Resin residue: 62%; yield: quantitative. After 6 weeks' storage at room temperature, the viscosity had risen only to 333 mPa.s (20° C.).

4. Comparison 1 (resorcinol novolak) phenol resin D 660 T of resorcinol and 75 T of water are melted and 3 T of 12.5% sulphuric acid are added. 390 T of an aqueous 30% formaldehyde solution are added dropwise to this melt heated to 110° C., and the mixture is maintained at this temperature until the formaldehyde content is 0%. The resin is cooled to 80° C. and 432 T of 33% sodium hydroxide solution are added. Residue: 65%; yield: quantitative; viscosity: 2640 mPa.s (20° C.).

5. Comparison 2-Condensation product of a mixture of a resorcinol novolak with a phenol resol Phenol resin E 1. 440 T of resorcinol and 50 T of water are melted and 2 T of 12.5% sulphuric acid are added. 211 T of an aqueous 37% formaldehyde solution are added dropwise to this melt heated to 115° C., and the mixture is maintained at this temperature until the formaldehyde content is 0%.

Phenol resin E 2. 940 T of phenol are melted, 720 T of sodium hydroxide solution (33%) are added and the mixture is heated to 60° C. 614 T of a 37% formaldehyde solution, 205 T of paraformaldehyde (91%) are added at this temperature at a rate depending on the exothermic reaction and the reaction mixture is maintained at this temperature until the formaldehyde content is 0%. The cooled total quantity of the resin E 1 described above is added to this mixture and the mixture is heated to 70° C. until the viscosity is 145 mPa.s (20° C.). Residue: 57.5%, yield: quantitative.

6. Comparison 3

A binder mixture of 95% phenol resin A (as described above) and 5% resorcinol is used for the test shown in the Table (see Table, Example 6).

Production of the abrasive

A vulcanized sheet 0.8 mm in thickness and having a weight per unit area of about 1000 g/m², especially manufactured for the abrasive industry, is coated with a basic binder to form a film of binder of thickness 150 μm when wet, and standard corundum (electrocorundum) of particle size 16 is then distributed over the binder in a quantity of 1600 g/m². The Experimental mixtures shown in the Table are used as basic binders in the form given. The samples shown in the Table are then pre-dried as indicated. The sizer is then applied to form a layer in an amount of 600 g/m² when wet. The substance used as sizer is the stated phenolic resin mixture with its own quantity by weight of powdered lime (average particle size 10 μm). The layers are then cured at 130° C., as indicated in the Table, and the samples are then air conditioned at 25° C. and about 90% relative humidity for 24 hours. Annular discs having an external diameter of 178 mm and an internal diameter of 22 mm are then punched from the coated vulcanized sheet, and the layers of binder are broken in the usual manner.

Abrasion test

The discs are subjected to an abrasion test based on the principle of "edge polishing". In this test, they are pressed against the edge of a 3 mm thick Cr-Ni-steel sheet with a force of 80N, with their plane of rotation set at an angle of 25° to the sheet. The disc is rotated at a speed of 3200 revs/min for 9 minutes. The weight loss V of the abrasive discs and the weight A of the steel removed from the sheet are measured and used to determine the abrasion index.

TABLE

| Experiment No. | Binder Component I Phenol resin | Binder Component I Proportion [%] | Binder Component II Phenol resin | Binder Component II Proportion [%] | B-Time 120° C. [min] | Stability in storage of phenolic resins (Time required for 50% increase in viscosity at 20° C.) [weeks] |
|---|---|---|---|---|---|---|
| 1 | A | 90 | C | 10 | 8 | — |
| 2 | A | 80 | C | 20 | 6 | — |
| 3 | B | 80 | C | 20 | 7 | — |
| 4 (Comparison 1) | A | 80 | D | 20 | 5 | D:35 |
| 5 (Comparison 2) | A | 80 | E | 20 | 11 | E:12 |
| 6 (Comparison 3) | A | 95 | resorcinol | 5 | 25 | — |
| 7 (Comparison 4) | A | 100 | — | — | 22 | 28 |
| 8 (Comparison 5) | — | — | C | 100 | 30 | 30 |
| 9 (Comparison 6) | B | 100 | — | — | 10 | 3 |

| Experiment No. | Curing Pre-drying at 90° C. [min.] | time Curing at 130° C. [min.] | Total [min.] | Emission from 50 μm film 1 hour, 100° C. Formaldehyde [%] | Emission from 50 μm film 1 hour, 100° C. Phenol [%] | Abrasion Index [A/V] |
|---|---|---|---|---|---|---|
| 1 | 50 | 30 | 80 | 0.2 | 5.0 | 8.3 |
| 2 | 40 | 20 | 60 | 0.1 | 2.9 | 9.0 |
| 3 | 70 | 30 | 100 | 0.2 | 4.1 | 8.8 |
| 4 | 60 | 30 | 90 | 0.1 | 3.1 | 7.5 |
| 5 | 90 | 60 | 150 | 0.3 | 4.2 | 7.0 |
| 6 | 150 | 180 | 330 | 0.4 | 8.6 | 5.8 |
| 7 | 140 | 120 | 260 | 0.9 | 6.2 | 7.7 |
| 8 | 200 | 240 | 440 | 0.0 | 4.7 | 0.8 |
| 9 | 120 | 90 | 210 | 1.0 | 7.0 | 7.5 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We claim:

1. A process for producing a flexible abrasive article comprising in sequence the steps of:
   A. applying on a flexible substrate a first layer of a binder comprising a resinous component;
   B. distributing abrasive particles in the first layer to form a particle embedded layer;
   C. drying the first layer;
   D. applying a second layer of a binder comprising a resinous component to the particle embedded layer to form a composite structure;
   E. drying the second layer;
   F. heating the composite structure to cure the first layer and the second layer;
   wherein the resinous component of the binders used in steps A and D consists essentially of Component I and Component II;
   wherein Component I is the reaction product of a monohydric phenol and formaldehyde in the molar ratio of 1:1.1 to 1:2.2; and
   wherein Component II is a co-condensate of (a) a monohydric phenol, (b) a polyhydric phenol and (c) formaldehyde; wherein the molar ratio of a:c is from 1:1.1 to 1:1.9; wherein the molar ratio of a:b is from 1:0.1 to 1:2.0; wherein the molar ratio of (a+b):c is from 1:0.6 to 1:1.5; and wherein the weight ratio of I:II is at least 70:30 and at most 95:5; with the proviso that in the resinous component the total amount of the polyhydric phenol is equal to or less than it is in a resinous component derived from Component I and Component II in a mixing ratio of 70:30 by weight; and wherein Component II has a molar ratio of 1.5 moles of polyhydric phenol to one mole of monohydric phenol.

2. Method as claimed in claim 1 wherein a phenolic resin is used in Steps (A) and (D) having a molar ratio of monohydric phenol to formaldehyde in component (I) from 1:1.3 to 1:1.5.

3. Method as claimed in claim 1 wherein a mixture of phenolic resins is employed wherein component (I) has a viscosity of from 200 to 2000 mPa.s/20° C. and component (II) has a viscosity of from 100 to 2000 mPa.s/20° C.

4. Method as claimed in claim 1 wherein a mixture of phenolic resins is employed wherein component (II) is derived from 1.3 to 1.8 mol of formaldehyde and of from 0.2 to 1.5 mol of a polyhydric phenol, both per mol of monohydric phenol, the molar ratio of the quantities of formaldehyde used to the sum of phenols being in the range of from 0.7 to 1.3:1.

5. Method as claimed in claim 1 wherein a mixture of phenolic resins is employed wherein the monohydric phenol is monohydroxybenzene, and the polyhydric phenol is resorcinol.

6. Method as claimed in claim 1 wherein a mixture of phenolic resins is employed wherein components (I) and (II) are mixed together in a proportion of from 90:10 to 80:20.

7. Method as claimed in claim 1 wherein a synthetic binder is employed containing of from 1 to 20% by weight, based on the total quantity of binder, of a water-soluble mono- or polyhydric alcohol.

8. Method as claimed in claim 1 wherein the basic layer and the sizer additionally contain conventional fillers.

9. An abrasive material prepared by the method claimed in claim 1.

10. A process for producing a flexible abrasive article comprising in sequence the steps of:
A. applying on a flexible substrate a first layer of a binder comprising a resinous component;
B. distributing abrasive particles in the first layer to form a particle embedded layer;
C. drying the first layer;
D. applying a second layer of a binder comprising a resinous component to the particle embedded layer to form a composite structure;
E. drying the second layer;
F. heating the composite structure to cure the first layer and the second layer;
wherein the resinous component of the binders used in steps A and D consists essentially of Component I and Component II;
wherein Component I is the reaction product of 1.1 to 1.5 mols of formaldehyde with 1 mol of phenol ($C_6H_5OH$) having a viscosity of from 200 to 2000 mPa.s/20° C.; and
wherein Component II is a co-condensate of (a) phenol ($C_6H_5OH$), (b) resorcinol and (c) formaldehyde wherein the molar ratio of a:c is from 1:1.3 to 1:1.8; wherein the molar ratio of a:b is from 1:0.2 to 1:1.5; wherein the molar ratio of (a+b):c is from 1:0.7 to 1:1.3; and the viscosity of Component II is from 100 to 2000 mPa.s/20° C.; and wherein the weight ratio of I:II is from 90:10 to 80:20.

11. A process for producing a flexible abrasive article comprising in sequence the steps of:
A. applying on a flexible substrate a first layer of a binder comprising a resinous component;
B. distributing abrasive particles in the first layer to form a particle embedded layer;
C. drying the first layer;
D. applying a second layer of a binder comprising a resinous component to the particle embedded layer to form a composite structure;
E. drying the second layer;
F. heating the composite structure in the absence of a formaldehyde generating agent to cure the first layer and the second layer;
wherein the resinous component of the binders used in steps A and D consists essentially of Component I and Component II;
wherein Component I is the reaction product of a monohydric phenol and formaldehyde in the molar ratio of 1:1.1 to 1:2.2; and
wherein Component II is a co-condensate of (a) a monohydric phenol, (b) a polyhydric phenol and (c) formaldehyde; wherein the molar ratio of a:c is from 1:1.1 to 1:1.9; wherein the molar ratio of a:b is from 1:0.1 to 1:2.0; wherein the molar ratio of (a+b):c is from 1:0.6 to 1:1.5; and
wherein the weight ratio of I:II is at least 70:30 and at most 95:5.

12. The process of claim 11 wherein the formaldehyde generating agent is hexamethylene tetramine.

13. A process for producing a flexible abrasive article comprising in sequence the steps of:
A. applying on a flexible substrate a first layer of a binder comprising a resinous component;
B. distributing abrasive particles in the first layer to form a particle embedded layer;
C. drying the first layer;
D. applying a second layer of a binder comprising a resinous component to the particle embedded layer to form a composite structure;
E. drying the second layer;
F. heating the composite structure in the absence of a formaldehyde generating agent to cure the first layer and the second layer;
wherein the resinous component of the binders used in steps A and D consists essentially of Component I and Component II;
wherein Component I is the reaction product of a monohydric phenol and formaldehyde in the molar ratio of 1:1.1 to 1:2.2; and
wherein Component II is a co-condensate of (a) a monohydric phenol, (b) a polyhydric phenol and (c) formaldehyde; wherein the molar ratio of a:c is from 1:1.1 to 1:1.9; wherein the molar ratio of a:b is from 1:0.1 to 1:2.0; wherein the molar ratio of (a+b):c is from 1:0.6 to 1:1.5; and
wherein the weight ratio of I:II is at least 70:30 and at most 95:5; with the proviso that in the resinous component the total amount of the polyhydric phenol is equal to or less than it is in a resinous component derived from Component I and Component II in a mixing ratio of 70:30 by weight; and wherein Component II has a molar ratio of 1.5 moles of polyhydric phenol to one mole of monohydric phenol.

14. The process of claim 13 wherein the formaldehyde generating agent is hexamethylene tetramine.

* * * * *